Oct. 16, 1962 D. K. FOSTER 3,058,572
APPARATUS FOR SUPPORTING SHEETS
Filed June 1, 1959 2 Sheets-Sheet 1

INVENTOR.
Dale K. Foster
BY
Nobbe & Swope
ATTORNEYS

Oct. 16, 1962 D. K. FOSTER 3,058,572
APPARATUS FOR SUPPORTING SHEETS
Filed June 1, 1959 2 Sheets-Sheet 2
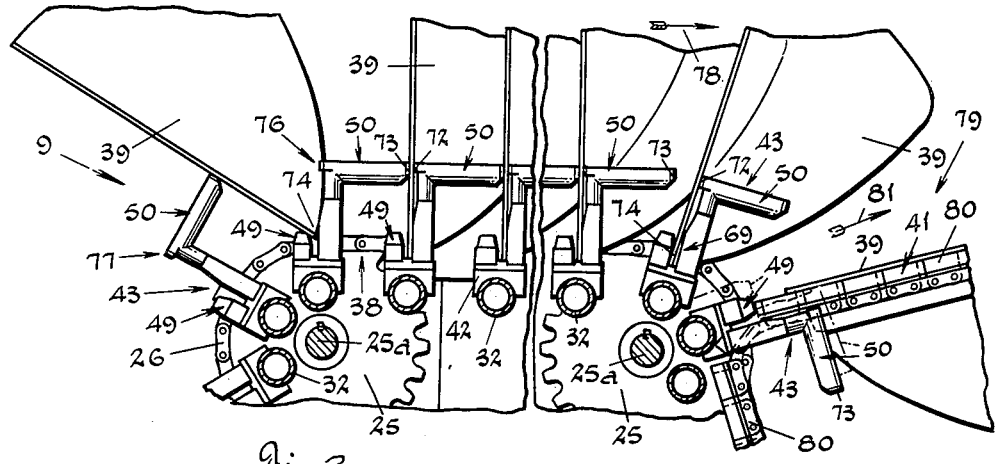
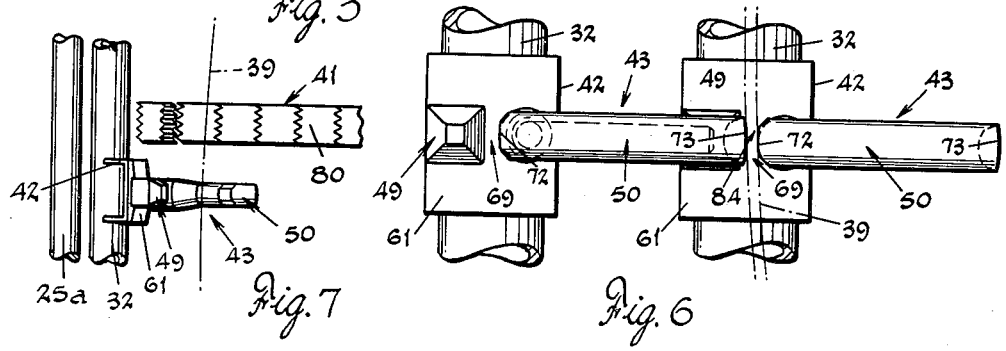
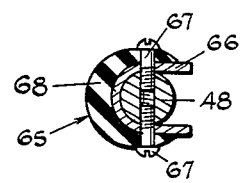
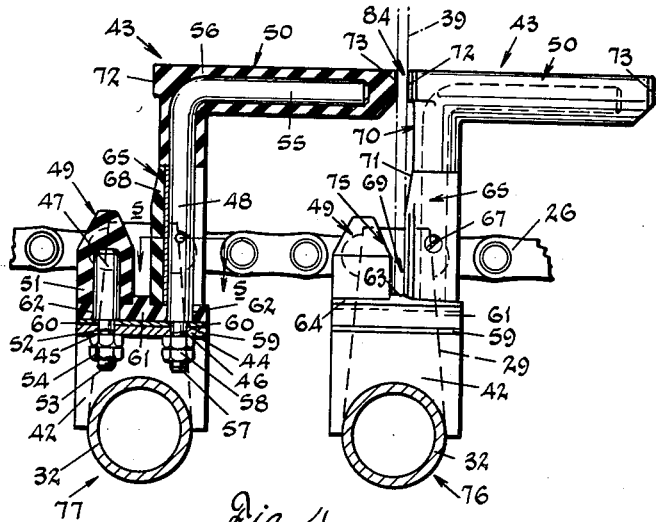
INVENTOR.
Dale K. Foster
BY
Nobbe & Swope
ATTORNEYS United States Patent Office 3,058,572
Patented Oct. 16, 1962

3,058,572
APPARATUS FOR SUPPORTING SHEETS
Dale K. Foster, % Libbey-Owens-Ford Glass Co.,
1701 E. Broadway, Toledo, Ohio
Filed June 1, 1959, Ser. No. 817,197
3 Claims. (Cl. 198—134)

This invention relates broadly to improved apparatus for handling sheet material and more particularly to novel apparatus for supporting individual sheets of material and for conveying them along a predetermined path.

The present invention is of utility when used in combination with a conveyor, upon which sheet material is carried along a substantially horizontal path, to maintain the sheets in a vertical position. It has been found to have particular utility for conveying curved automotive windshields through a processing zone or washing machine.

Glass sheets that are to be used in the manufacture of safety glass, i.e. a glass that is laminated with one or more layers of plastic interposed between and bonded to glass sheets, must be very thoroughly cleaned before they are assembled with the plastic interlayers. Any failure to completely clean the glass surfaces, that are to be bonded to the plastic interlayer, results in an inferior bond and in discoloration or spots that make the resulting laminated glass commercially unacceptable.

To accomplish this washing, there has been developed washing apparatus suitable for conveying glass sheets through a plurality of processing zones. However, with the advent of curved panoramic or wrap-around windshields, the conveyor systems presently in existence proved to be inadequate. The prior conveyor systems were limited, by their construction, to the handling of flat glass sheets and the curved edges of the present windshield precluded their easy transfer into, through and from these prior systems.

It has additionally been found that when a sheet is passed through a washing machine, considerable pressure forces are brought to bear upon the sheet through the medium of the forced washing solution sprayed or otherwise directed against the surfaces of these sheets. Although the present invention will be particularly described as to its advantages when employed in such a washing machine, to maintain and support the sheets rigidly in their vertical position against the pressure forces, it should be understood that the supporting means for the sheets disclosed herein likewise are applicable for supporting any type of sheet material in spaced relationship and in a substantially vertical position when said sheets are being carried along a substantially continuous path. Such a sheet supporting means, as will be herein described, affords simplicity of the handling of the sheets without damage or marring and also, as will be later discussed, maintains the sheets substantially immobile and firmly against forces directed onto or against the sheets.

The principal object of the present invention is therefore to provide an improved sheet support assembly, for use in combination with a conveyor, adapted to carry the sheet material along the path of a conveyor.

It is another object of the present invention to provide a novel sheet supporting assembly that will hold the sheets fixedly in a substantially vertical position, with a spaced relationship between all of the sheets to prevent possible damage to the sheets as the sheets are transported.

It is another object of the present invention to provide an improved conveying apparatus suitable for receiving glass sheets, for carrying them through a washing apparatus and for discharging them onto a suitable carry-off conveyor to be transported to a subsequent laminating and finishing station, which conveying apparatus assures that the sheets, as they are washed, are positioned so that each sheet is thoroughly cleaned.

It is still another object of the present invention to provide a resilient or suitable protective covering between the glass sheets and at least the portions of the support means in physical contact with the glass to prevent possible marring of each sheet as it moves along the predetermined path.

It is still another object of the present invention to provide for the selective replacement of the protective covering of the sheet support means in those areas of the support means that are subjected to the greatest wear.

Other objects and advantages of the invention will become more apparent during the course of the following description when taken in connection with the accompanying drawings.

In the drawings, wherein like numerals are employed to designate like parts throughout the same:

FIG. 3 is an enlarged partial side elevation partly in section and with parts broken away of the glass conveying and supporting apparatus;

FIG. 4 is an enlarged fragmentary side elevation of a portion of FIG. 3 showing a pair of supporting fingers, partly in section and with parts broken away;

FIG. 5 is a sectional view taken on line 5—5 of FIG. 4;

FIG. 6 is an enlarged top plan view of a portion of FIG. 4 showing the pair of fingers in sheet supporting relationship; and FIG. 7 is a fragmentary top plan view of a portion of FIG. 3 showing the relationship of one of the fingers to one belt of the carry-off conveyor.

Figure 1:
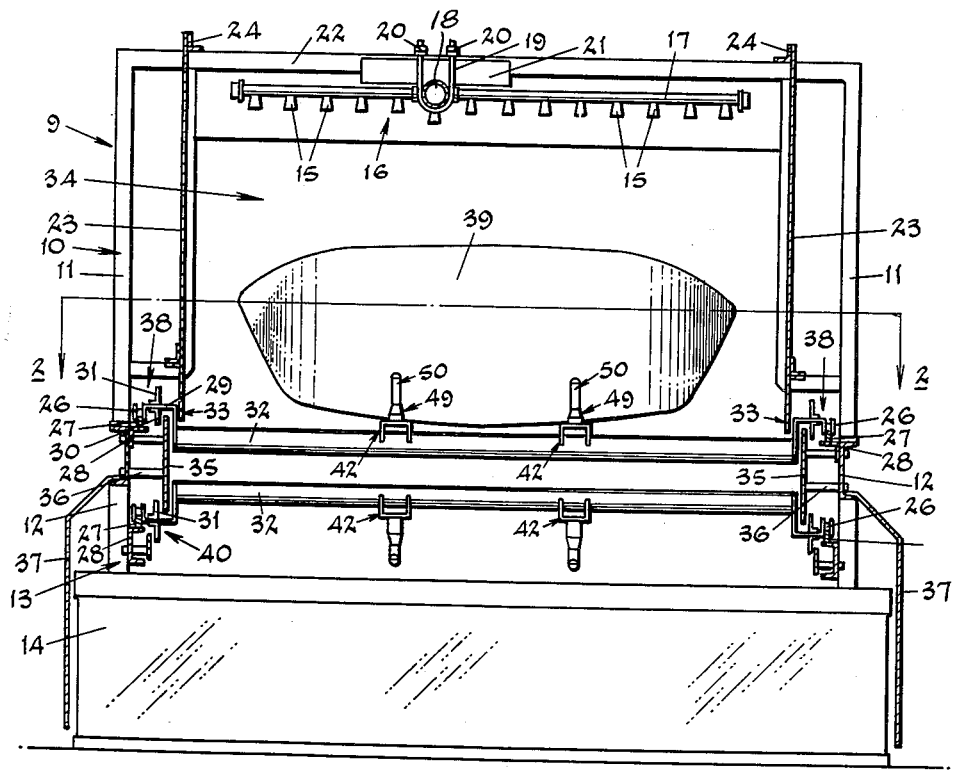
FIG. 1 is an elevational view of the entrance end of a glass sheet washing machine.

Referring now to FIG. 1 there is illustrated the entrance end 9 of a washing machine which is used to wash the glass sheets individually, prior to lamination. A general support frame 10 is provided that includes a plurality of support walls 11 resting on the support member 12 of base 13. This base includes an open top basin or fluid receiving tub 14 adapted to receive the water or other cleansing fluid that is directed downwardly from a plurality of nozzles 15. Since the actual detailed washing procedure does not constitute part of this invention only that portion of the washing machine which, it is believed, is essential to an understanding of the operation has been shown and will be herein described.

A suitable fluid introducing conduit system 16 has been provided which includes a plurality of transverse cross pipes 17, carrying nozzles 15, and at least one interconnected longitudinally extending pipe 18 into which the cleaning fluid may be suitably introduced under pressure to flow through freely connected pipes 17 and nozzles 15 to clean the glass sheets. The pipe 18 may be supported by a U-shaped threaded rod 19 which by nuts 20 is suitably held in position to a transverse bar 21 that itself is supported by the transverse frame bars 22 suitably joined to walls 23.

The washing chamber is defined by a pair of side walls 23 that channel the spray to insure its collection in tub 14. These walls 23 are secured by any conventional means, such as welding, to the longitudinally extending angle irons 24 resting on frame bars 22 that are themselves supported on each side of the path of the conveyor. At each end of the machine frame 10 are sprockets 25 (FIG. 3) keyed to shafts 25a suitably journaled to the frame 10 and around which a pair of conveyor chain belts 26 are entrained (FIG. 3). One shaft 25a is driven by any suitable means so that an endless path is described by the conveyor chain belts 26 through an upper and lower flight thereof through the washing apparatus. The chains are guided along and between longitudinal tracks 27 that are themselves supported by angle irons 28 welded or otherwise suitably mounted to the frame of the apparatus.

Welded to spaced links of each chain belt 26 are a plurality of inwardly extending, relative to the chains, supports plates 29 that are held horizontal by their own support or guide means composed of the angle irons 30 and 31 for a purpose to be later described. The inward end of each plate 29 is downwardly bent at a 90° angle to provide support for the plurality of glass sheet carrying rods or bars 32 supported between opposite plates just below the lower extremity 33 of side walls 23 of the washing chamber 34. A shield 35 is mounted by supporting rods 36 from the frame to protect the chain belts 26 and sprockets 25 from the washing spray and a covering hood 37 is also provided over the tub 14.

It is therefore seen that chain belts 26 will carry the rods 32 along an upper train or flight, indicated by the reference numeral 38 where they carry the windshields 39 through washing chamber 34. After discharging the sheets onto a carry-off conveyor 41 (FIG. 3), as will be later described, the bars 32 are carried by said chain belts through a lower run or flight, indicated by the reference numeral 40 to reposition these bars 32 so that they will receive additional windshields. The guide means 30 and 31 insure that the bars 32 will be carried along substantially horizontally and will prevent possible sagging of the bars 32 under the weight of the windshields 39 and also eliminate the possibility that undesirable lateral forces induced by the windshield weight will disengage the chain belts 26 from tracks 27.

Figure 2:
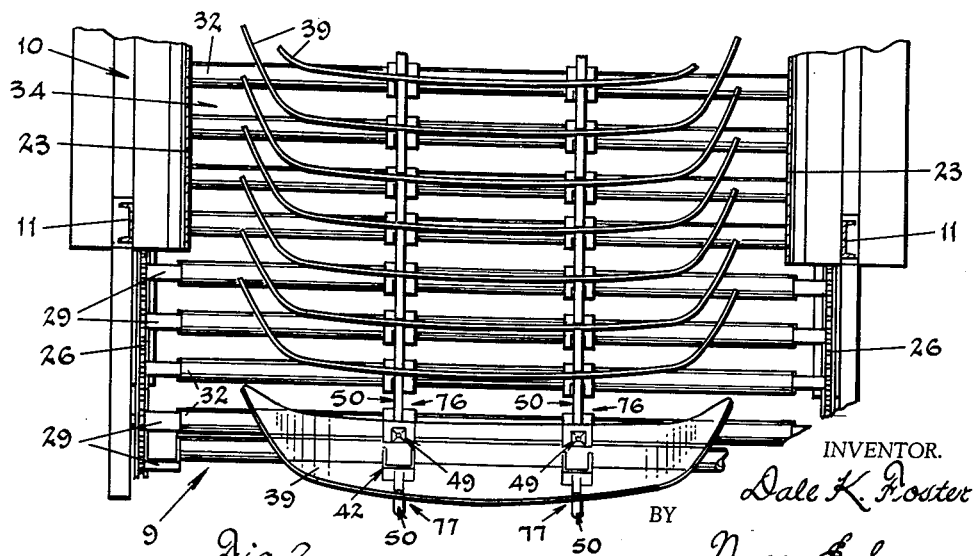
FIG. 2 is a sectional view taken on line 2—2 of FIG. 1.

Welded or otherwise mounted to each bar 32 are a pair of U-shaped webs 42 on each of which are mounted the glass supporting and contacting members 43, disposed in pairs, as seen in FIG. 2, on opposite sides of the longitudinal center line of the windshield 39.

Each member 43 has a horizontal platform 44 with a pair of spaced openings 45, 46 formed therein to receive post members 47, 48 respectively. These posts 47, 48 constitute the main elements of the two fingers 49, 50 of each supporting member 43 (FIG. 4). The finger 49, i.e. post 47, has a resilient sheath 51 in surrounding relationship about the post with a truncated pyramidal upper portion and rectangular base. The lower end 52 of post 47, below the rectangular base where post 47 passes through opening 45 is free of any casing and extremity 53 of the post end 52 is threaded to receive lock nut 54. The finger 50 is higher than the finger 49 and has an inverted L-shaped portion provided by the horizontally extending leg 55 of post 48. A resilient casing 56 surrounds leg 55 and extends slightly around the L bend and downwardly towards platform 44. The remainder of post 48 is free from any integral covering and the lower extremity of post 48, where the post passes through opening 46, is free of any covering and is further threaded at 57 to receive locking nut 58.

Resting on the upper surface of each platform 44 is a plate 59 with a pair of spaced openings 60, coincident with openings 45, 46. A layer 61 of rubber or other shock absorbing material having similar coincident openings 62 is vulcanized to the upper surface of this plate 59. This layer 61 has a center lip 63, shouldered at 64, so that when post 47 is passed through openings 62, 60 and 45 and then bolted firm, the base of truncated pyramid 51 rests on shoulder 64. Post 48 is similarly secured by passing it through openings 62, 60 and 46. A removable sheath 65 (FIG. 5), to be later described is placed about the bare portion of rod or post 48 so that the base of the sheath 65 rests in shoulder 64.

The removable sheath 65 is preferred to a permanent covering because normal use wears this particular portion to excess and it is a desirable feature to merely replace the sheath 65 rather than the entire finger 50 on member 43. This sheath includes a U-shaped plate 66 (FIG. 5) that is pierced by suitable openings to receive securing screws 67 which themselves extend through the shock absorbent covering 68 vulcanized to plate 66, and into threaded openings in rod or post 48. Therefore, it is seen that the sheath 65, when worn, can be removed by merely removing screws 67 and posts 47, 48 need not be disturbed. Also, if these posts 47, 48 are removed for any reason, the resilient base pad 61 and plate 59 unit can be replaced as for example if lip 63 is worn from supporting a resting edge of windshield 39. This windshield edge is normally carried resting on lip 63 in slot or pocket 69 between the covering 51, on post 47, and the covering 68, on sheath 65 about post 48, the thickness of this slot 69 being about the same as the thickness of a windshield carried in the slot.

Referring to FIG. 4 and most particularly referring to the covering on post 48, i.e. covering 68 and casing 56, it is noted that they have a slightly reduced thickness at their point of joining and form cutout 70 to facilitate entry of the glass sheet into pocket 69. The tapered surface 71 of covering 68 on sheath 65 is desirable to assist the sheet of glass to slide into place in slot 69. The covering 56 about leg 55 of post 48 has a portion of enlarged thickness to determine a rearwardly projecting heel or trail end pad 72 and a forwardly projecting nose or lead end pad 73, taken with respect to the direction or line of movement of the conveyor which, as will be described, form the physical contact points to support and position the windshield. The nose 73 of one finger 50 cooperates with the heel 72 of the immediately forwardly located finger 50 of an adjacent support member 43 to accomplish this purpose.

Referring now to FIG. 3, the support means 43 are located and spaced so that when the chain belts 26 carry the bars 32 along the substantially horizontal upper flight 38, the various fingers 49 and 50 assume a substantially vertical position with the leg portions 55 of each finger 50 disposed in substantially the same plane and in nose to heel parallelism. A windshield 39, by hand, may be initially delivered at entrance end 9 of the machine and so placed by the operator that one edge, i.e. edge 74, slides down the tapered surface 71 of finger 50 and down the slanted edge 75 (FIG. 4) of finger 49 of one pair of fingers 76. The windshield is thus supported on an incline (FIG. 3) by the nose portion 73 on a finger 50 of the following pair of fingers 77. This finger action takes place on each side of the windshield as seen in FIG. 2. As the fingers move along chain belts 26, carried in the direction of the arrow, indicated by the reference numeral 78 (FIG. 3), the finger pair 77 moves into the horizontal upper flight 38 of the chains, so that the windshield 39 is raised from the inclined position of FIG. 3 and is vertically supported as shown in FIGS. 4 and 6. The windshield edge 74 now rests on lip 63, having slid down the tapered windshield surface of sheath 65 on the finger 50 of the pair of fingers 76 while the nose 73 on leg portion 55 of finger 50 of a following pair of fingers 77, lifts the windshield into a vertical plane. The opposed faces of the vertical windshield 39 (FIG. 4) are now substantially pinched or at least in engagement with the noses 73 of the pair of fingers 77 and the heels 72 of the pair preceding and ready to be carried along upper flight 38 for washing.

The windshield is carried the full length of upper flight 38 vertically supported by a single edge contact 74, i.e. on lip 63 of pad 61, and only two point contact on each face of its major surface area, i.e. two noses 73 on one surface and two heels 72 on the other surface. Thus, the windshield or glass sheet can be firmly held so as to be substantially rigid, by a close tolerance fit of slot 69 and by the pinch between a nose 73 and a heel 72.

At the exit end 79 (FIG. 3) of the washer, as the supporting members 43 are carried downwardly about a sprocket 25 by the associated chain belts 26 to start their return along lower flight 40 to be continuously repositioned to receive subsequently placed additional windshields, the windshield 39 is lowered and swung downwardly to an inclined angle again. The windshield rests on a heel 72 of the finger 50 in advance of the sheet and cannot pivot about this heel 72 and fall, because edge 74 is held in slot 69 by finger 49 of the same support member 43.

The carry-off conveyor 41 includes two belts or chains 80 driven in the direction of the arrow, indicated by the reference numeral 81. These belts 80 are positioned outside and on each side of the support members 43 (FIG. 7) and are adapted to engage the major surface area of each successive sheet as it is lowered about the exit end sprocket 25. Through frictional engagement with the sheet the belt 80 will draw the sheet from slot 69 and along the path of conveyor 41 in the direction of arrow 81. Each individual sheet of glass or windshield, that is so removed, is carried along and out of the way by discharge conveyor 41 before the succeeding windshield is lowered by reason of the speed at which the conveyor 41 is caused to move as related to the speed of the travel of the conveyor chain belts 26 carrying the sheets.

Therefore the windshields are received at entrance end 9, carried individually along the upper flight 38 of the washing machine and discharged at exit end 79 while supported at a minimum number of contact points and at the same time held in a substantially firm vertical position. The supporting members 43 are so constructed to prevent unnecessary marring or damage to the sheets while they are loaded, carried and discharged by reason of their resilient covering, construction, shape and cooperative action. Certain individual components of these support members 43, i.e. sheath 65 and pad 61, are adapted for easy removal and replacement during wear so that proper support is always assured.

A restricted space 84 is formed between the two posts 50 of two following pairs of fingers to constitute a further sheet support means, i.e. the opening between the nose 73 on one support member 43 and the heel 72 of the member 43 in direct advance thereof. This space 84 is measured and controlled to insure that the windshield held therein does not vibrate unnecessarily and is essentially equal to the windshield thickness so that each individual glass sheet is held firmly and at the same time without undue pressure. Thus complete washing is possible, and at the same time smooth, steady and efficient handling assured by the action of the supporting members 43 hereinbefore described.

It is to be remembered however, that these support members 43 with their resilient covering will secure the hereinabove discussed advantages of sheet positioning and spacing for any type of sheet material which is conveyed along a predetermined path, as by the conveyor chain belts 26 hereinbefore described (FIG. 4) which carries the sheets substantially horizontally along the upper flight of the conveyor belts indicated by the arrow indicated by the reference numeral 38 (FIGS. 1 and 3), that is primarily moving in the direction of the arrow, designated by the reference numeral 78 (FIG. 3). While the invention has been described most particularly with respect to its utility in combination with a washing machine, it must be understood that the novel support means or members 43 have utility with a conveyor carrying both frangible and nonfrangible sheet material.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. Apparatus for supporting a plurality of sheets on edge on a carrier to be moved in spaced face-to-face relationship along a predetermined path, comprising a plurality of sheet supporting members spaced apart along said carrier, each of said members having a support platform parallel to said carrier, a first finger upstanding from said platform with a laterally projecting portion integral with the outer end thereof, said lateral portion being spaced above said carrier and extending parallel to said path and having abutment surfaces formed on opposite ends thereof to cooperate with mating surfaces on the lateral portions of adjacent members, a second finger upstanding from said platform parallel to said first finger and spaced from the latter to form an outwardly opening pocket adapted to receive an edge portion of a sheet to be conveyed with the edge of the sheet resting on said platform and with the sheet being clamped outwardly of said pocket between said mating abutment surfaces, said members being carried on said conveyor to rock relative to each other to move said mating abutment surfaces into and out of clamping engagement with said sheets.

2. Apparatus for supporting a plurality of sheets as defined by claim 1, in which each of said first fingers comprises inverted L-shaped elements having one leg fixed to said support platform and upstanding therefrom and the other leg disposed above and extending parallel to said chains, said abutment surfaces being formed on opposite ends of said other leg.

3. Apparatus for supporting a plurality of sheets on edge to be moved in spaced face-to-face relationship along a predetermined path defined by a conveyor having parallel spaced endless chains driven endwise along said path and bridged by a plurality of cross members extending transversely across the path, said apparatus comprising a plurality of sheet supporting members arranged in successive pairs and mounted on said cross members, the members of each pair being mounted on one of said cross members with one member being positioned on each side of the longitudinal centerline of said conveyor, each of said sheet supporting members having a support platform disposed parallel to said conveyor and first and second fingers upstanding therefrom to define an outwardly opening pocket in each member with the pockets in each pair of members being transversely aligned and adapted to receive an edge portion of a sheet to be conveyed, abutment surfaces formed on opposite sides of one of said fingers of each member to cooperate with mating abutment surfaces formed on one of said fingers of an adjacent member to clamp the sheet resting in said pocket between the adjacent members at points outwardly of said pockets, said members being mounted on said cross members whereby the outer ends thereof rock toward and away from each other in response to the movements of said chains thereby to move said mating abutment surfaces into and out of clamping engagement of said sheets.

References Cited in the file of this patent

UNITED STATES PATENTS

| | | |
|---|---|---|
| 1,414,424 | Lawson | May 2, 1922 |
| 1,453,022 | Philips | Apr. 24, 1923 |
| 1,810,859 | Thurmer | June 16, 1931 |
| 2,022,088 | Nelson | Nov. 26, 1935 |
| 2,390,075 | Dawn | Dec. 4, 1945 |
| 2,830,690 | Macoy et al. | Apr. 15, 1958 |
| 2,861,674 | Reist | Nov. 25, 1958 |